(12) United States Patent
Hegde

(10) Patent No.: US 12,544,940 B2
(45) Date of Patent: Feb. 10, 2026

(54) CONTAINED DRUM DISCHARGE SYSTEM AND METHOD FOR TOXIC POWDERY MATERIALS

(71) Applicant: Shreepad Hegde, Hyderabad (IN)

(72) Inventor: Shreepad Hegde, Hyderabad (IN)

(*) Notice: Subject to any disclaimer, the term of this patent is extended or adjusted under 35 U.S.C. 154(b) by 113 days.

(21) Appl. No.: 18/702,082

(22) PCT Filed: Apr. 28, 2022

(86) PCT No.: PCT/IB2022/053960
§ 371 (c)(1),
(2) Date: Apr. 17, 2024

(87) PCT Pub. No.: WO2023/067396
PCT Pub. Date: Apr. 27, 2023

(65) Prior Publication Data
US 2024/0408775 A1  Dec. 12, 2024

(30) Foreign Application Priority Data

Oct. 19, 2021 (IN) .............................. 202141047303

(51) Int. Cl.
| | |
|---|---|
| *B65B 69/00* | (2006.01) |
| *B25J 21/02* | (2006.01) |
| *B65G 53/04* | (2006.01) |
| *B65G 53/40* | (2006.01) |

(52) U.S. Cl.
CPC .............. *B25J 21/02* (2013.01); *B65G 53/04* (2013.01); *B65G 53/40* (2013.01)

(58) Field of Classification Search
None
See application file for complete search history.

(56) References Cited

U.S. PATENT DOCUMENTS

| | | | | |
|---|---|---|---|---|
| 3,888,556 | A * | 6/1975 | Strong .................... | G21F 7/041 |
| | | | | 137/810 |
| 5,170,027 | A * | 12/1992 | Brodersen .............. | B23K 9/325 |
| | | | | 219/136 |
| 5,628,665 | A * | 5/1997 | Lang ....................... | H01J 9/395 |
| | | | | 445/71 |

(Continued)

OTHER PUBLICATIONS

Hecht CFE-K-EC May 14, 2021 https://www.youtube.com/watch?v=nFVZP1-9SMM.*

(Continued)

*Primary Examiner* — Joseph A Dillon, Jr.
(74) *Attorney, Agent, or Firm* — Tatonetti IP

(57) ABSTRACT

A contained drum discharge system comprising a drum and connected with a lifting mechanism, wherein the drum includes a primary liner bag having the toxic powdery material to be disposed, contained within the secondary liner bag, and a tertiary liner bag enclosing the secondary liner bag; a transparent glove box; a hopper connected at a top of the glove box and with a vacuum transfer system of a material processing reactor; and a control unit connected with the glove box via a rotation mechanism and with the lifting mechanism of the drum. The glove box includes a plurality of glove ports connected with respective glove attachments; a plurality of thrashout ports with door; a sealing gasket to connect with the drum; a first liner port; a second liner port and a third liner port.

10 Claims, 13 Drawing Sheets

(56) References Cited

U.S. PATENT DOCUMENTS

| | | | | |
|---|---|---|---|---|
| 5,730,765 | A * | 3/1998 | Henry | B01L 1/02 |
| | | | | 55/385.2 |
| 5,890,781 | A * | 4/1999 | Ryder | B25J 21/02 |
| | | | | 312/3 |
| 6,235,072 | B1 * | 5/2001 | Kopylov | B01D 46/90 |
| | | | | 55/385.2 |
| 9,194,175 | B2 * | 11/2015 | Lemonds | E05C 3/043 |
| 9,421,933 | B1 * | 8/2016 | Mazzocchi | B60R 21/045 |
| 11,967,438 | B2 * | 4/2024 | Burns | G21F 5/14 |
| 2001/0004182 | A1 * | 6/2001 | Bennison | B25J 21/02 |
| | | | | 312/1 |
| 2005/0263209 | A1 * | 12/2005 | Dietrich | B65B 1/16 |
| | | | | 141/114 |
| 2011/0258967 | A1 * | 10/2011 | Dietrich, Jr. | B65B 69/0075 |
| | | | | 53/449 |
| 2016/0368719 | A1 * | 12/2016 | Hecht | B65G 69/181 |
| 2020/0370356 | A1 * | 11/2020 | Rapetti | E05F 15/627 |
| 2025/0196376 | A1 * | 6/2025 | Nantermoz | B25J 19/0075 |

OTHER PUBLICATIONS

Hecht CFE-K-EC https://www.directindustry.com/prod/hecht-technologie-gmbh/product-164477-2474344.html.*
International Search Report mailed Apr. 27, 2023, issued in connection with International Application No. PCT/IB2022/053960 (2 pages total).
Written Opinion mailed Apr. 27, 2023 issued in connection with International Application No. PCT/IB2022/053960 (4 pages total).
Hecht Technologie, "https://www.hecht.eu/en/products/discharging/drum-discharging/drum-discharger-cfe-l" last accessed Apr. 17, 2024.

* cited by examiner

CONTAINED DRUM DISCHARGE SYSTEM AND METHOD FOR TOXIC POWDERY MATERIALS

CROSS-REFERENCES TO RELATED APPLICATIONS

This Non-Provisional Utility patent application claims the benefit of and priority to PCT Application Serial No. PCT/IB2022/053960, filed Apr. 28, 2022, entitled "A CONTAINED DRUM DISCHARGE SYSTEM AND METHOD FOR TOXIC POWDERY MATERIALS," which claims the benefit of and priority to Indian Patent Application Serial No. 202141047303, filed Oct. 19, 2021, entitled "A CONTAINED DRUM DISCHARGE SYSTEM AND METHOD FOR TOXIC POWDERY MATERIALS," the entire contents of both applications of which are hereby incorporated herein by reference.

FIELD OF THE INVENTION

Embodiments of the present invention generally relate to systems and apparatuses for handling toxic or hazardous industrial materials, and more particularly to a contained drum discharge system and method for discharging toxic powdery materials, without exposure to operator and environment.

BACKGROUND

Handling a toxic or hazardous material in the industry is always a challenge. Human, environment, and product safety are the major aspects while handling toxic or hazardous products. There are various established automatic equipment and methods available for toxic liquid handling. However, when it comes to handling powders it has been always manual. Powders are generally stored and received in bags, drums, canisters, containers etc. Powders have to be transferred from these storage devices to process equipment in contained manner without exposure to the operator and to environment.

Transferring nontoxic or less toxic powders is fairly simple. There are reasonably secure equipment available for transfer of powder into the process equipment. Drum tippers, bag dump station with local extraction ventilators (LEV), Laminar Air Flow stations etc. are used.

Glove boxes and Isolators are used where small quantity of highly toxic or hazardous products are to be handled and transferred to the process equipment. The Glove boxes and Isolators are not suitable for discharge of large quantity of high toxic and hazardous material from the drum.

Powders of less toxic and hazardous material are transferred directly from the open drum/bag/container either manually or using vacuum/pressure transfer systems. Alternative methods used are like screw conveyor, IBC bin discharge etc. directly into the process equipment. Double valve hopper systems are used for unloading the powder product into the process equipment. However, the filling of the screw conveyor, double valve hopper is again manual and with risk of exposure.

Taking out the sample of toxic and hazardous powder material from the drum/container is equally challenging. Currently sample thief's are used to take out the sample. The drums & bags are opened to atmosphere to take out the samples. Thief's are used in open condition to take sample. Exposure to environment and operator is inevitable.

There is very little solution available in the industry for transferring large quantity of toxic and hazardous powder under inert atmosphere from a drum or bag. There is no simple and reliable solution available to transfer large quantity (bag, drum, container etc.) of highly toxic and hazardous powders. Current practice and equipment are unsafe to the operators, environment and to the product for handling/transferring large quantity of toxic products. The equipment available are very expensive involving robotics. However, it is not feasible to use robotics in all cases. Operators use safety pressure suite with breathing air supply etc. while the industrial activities are carried out. Further, controlling of exposure of the toxic and hazardous product in industry is a big challenge. Exposure of the product is detrimental to operator and to environment. In several cases exposure of the environment to the product is also detrimental to the quality of the product due to presence of oxygen, extraneous particles, micro-organisms, moisture, and light etc.

It is very difficult to transfer the powder under inert atmosphere with existing technology. The drum containment system presently available in the market is not suitable for transfer of large quantity of powder materials. They are expensive, difficult to operate, poor in user-friendliness. Moreover, they do not empty powder entirely from the drum, bag, or container. Being unable to transfer, 2-3%, sometimes up to 5% of the powder is left behind as a residue inside the drum or bag. This leads to not only loss of expensive product but also adds to the cost for safe disposal and effluent treatment. The presently available drum containment system uses additional rings to seal each bag and these rings gets contaminated in the process, leading to discarding it one for every bag. The additional ring used to seal the bag is sent out as scrap one for every bag, adding further to waste generation.

The presently available drum containment systems are not suitable for handling the products in multiple bags. If the products received in drum with multiple bags, the tertiary and secondary bags are opened outside atmosphere and only primary bags are locked and unloaded. This is a major problem in case of changeover of first drum to the next drum. Furthermore, the presently available drum containment systems are not suitable to use for taking out small quantity of samples in contained manner.

Hence, there exists a need for a contained drum discharge system and method for discharging toxic powdery materials, without exposure to operator and environment, that does not suffer from the above mentioned deficiencies. Such system and method should be simple, user friendly equipment for transfer of toxic and hazardous material from drum, bag, container to the process equipment in closed manner.

The object of the present invention is to provide a contained drum discharge system and method for discharging toxic powdery materials.

Another object of the invention is to provide a simple, user friendly equipment for transfer of toxic and hazardous material from drum, bag, container to the process equipment under inert or controlled atmosphere, without leaving residue or exposure to operator and environment.

Yet another object of the invention is to provide a system and method capable of handling the products in multiple bags and that are suitable for transfer of large quantity of powder materials, as well as suitable to use for taking out small quantity of samples in contained manner.

Yet another object of the invention is to measure a weight of the toxic powdery materials while discharging into a material processing reactor.

SUMMARY

According to a first aspect of the present invention, there is provided a contained drum discharge system for toxic powdery materials without exposure to operator and environment. The system comprises a drum connected with a lifting mechanism; a transparent glove box; a hopper connected at a top of the glove box and with a vacuum transfer system on a material processing reactor; and a control unit connected with the glove box via a rotation mechanism and with the lifting mechanism of the drum. Further, the drum includes a primary liner bag having the toxic powdery material to be disposed, contained within the secondary liner bag, and a tertiary liner bag enclosing the secondary liner bag. Additionally, transparent glove box has an upper deck and a lower deck; a plurality of glove ports connected with respective glove attachments, on one side and a plurality of thrashout ports with door on another side of the glove box; a sealing gasket to connect with the drum; first liner port provided at a bottom of the glove box; second liner port provided in a lower deck of the glove box and only accessible via the plurality of gloves ports in the lower deck; and third liner port provided in the upper deck of the glove box and only accessible via the plurality of glove ports in the upper deck.

In accordance with an embodiment of the present invention, the tertiary liner bag is adapted to be attached and sealed with the first liner port; the control unit is configured to actuate the lifting mechanism lift to the drum to connect with the glove box using the sealing gasket; the secondary liner bag is adapted to be attached and sealed with the second liner port; the primary liner bag is adapted to be attached and sealed with the third liner port, one by one, using respective coupling means; and the control unit is configured to actuate the rotation mechanism to rotate the glove box 180°, and thereby the connected drum and the hopper upside down to allow the toxic powdery material in the tertiary line bag to discharge completely into the hopper. Furthermore, the vacuum transfer system is configured to transfer the toxic powdery material from the hopper to the material processing reactor for processing. Also, the control unit is also configured to rotate the glove box back to original position and lower the drum as when required by an operator.

In accordance with an embodiment of the present invention, a space in between different liner bags and between the drum is sealed to prevent any external air entry, thereby ensuring only the toxic powdery material flows down and not the liner bags when the drum is turned upside down.

In accordance with an embodiment of the present invention, the plurality of thrashout ports include connected disposal bags, adapted to securely receive the primary liner bag and the secondary liner bag after emptying, and then taken out from the glove box.

In accordance with an embodiment of the present invention, the glove box is adapted to remain air-tight, enclosing a vacuum therein, and is made from an openable, sealed and latched transparent glass view panel. Moreover, the glove box includes HEPA filters in the upper deck and in the lower deck, nitrogen flushing nozzles, and water washing provision.

In accordance with the embodiment of the present invention, the glove box can also be connected to suction unit through HEPA filters to maintain the negative pressure inside the glove box. This will prevent escape of powder dust/gas from the glove box.

In accordance with an embodiment of the present invention, the third liner port is provided with a circular vacuum slot and the vacuum slot is connected to a vacuum pump through the HEPA filter.

In accordance with an embodiment of the present invention, the control unit houses the rotation mechanism, a PLC and a control panel.

In accordance with an embodiment of the present invention, the system also includes a trolley having a plurality of wheels to mount the system and transport the system as and when required by the operator.

According to another aspect of the invention, there is provided a contained drum discharge method for toxic powdery materials using the above system. The method comprises the steps of latching the tertiary liner bag to the first liner port of the glove box; lifting the drum and docking the drum to a gasket at the bottom of the glove box; latching the secondary liner bag to the second liner port; latching the primary liner bag to the third liner port; rotating the glove box by 180° and unloading the toxic powdery material contained in the primary liner bag to the hopper connected with the glove box; transferring the toxic powdery material through the vacuum transfer system to material processing reactor; rotating the glovebox back to the original position, lowering the drum and removing the tertiary liner bag; replacing the drum with a new drum by latching a new tertiary liner bag of the new drum to the first liner port; removing the secondary liner bag of the drum and opening the door and dumping it to thrash out port; latching a new secondary liner bag of the new drum to the second liner port; holding a new primary liner bag of the new drum onto a vacuum slot of the third liner port and removing the primary liner bag of first drum for dumping to the thrash out port through the opening door; and latching the second primary bag to the first liner port.

BRIEF DESCRIPTION OF THE DRAWINGS

These and other features, aspects, and advantages of the example embodiments will become better understood when the following detailed description is read with reference to the accompanying drawings in which like characters represent like parts throughout the drawings, wherein.

Figure 1A:
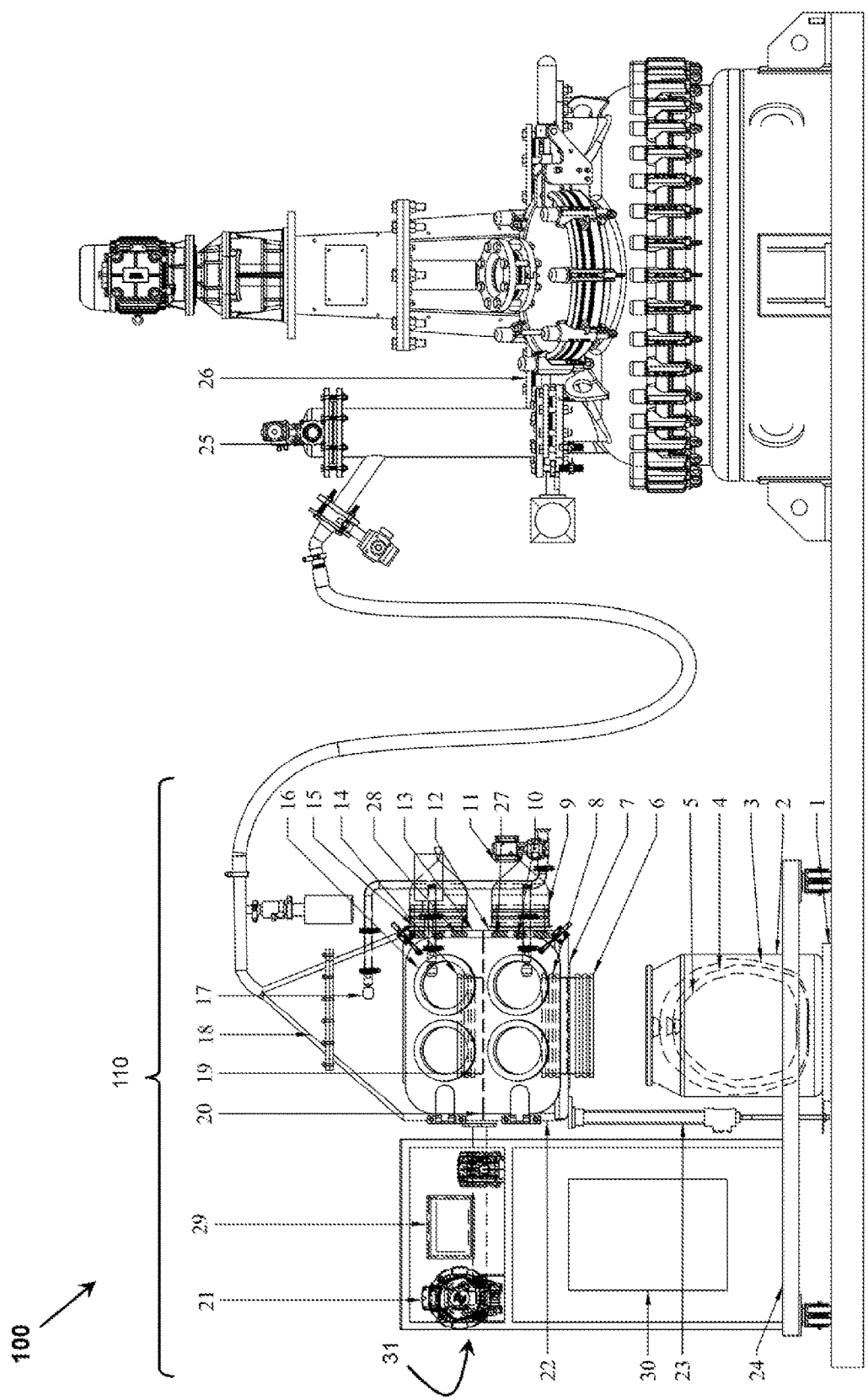
FIG. 1A-1B illustrates a contained drum discharge system for discharging toxic powdery materials, in accordance with an embodiment of the present invention.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION

While the present invention is described herein by way of example using embodiments, those skilled in the art will recognize that the invention is not limited to the embodiments described herein. It should be understood that the description herein is not intended to limit the invention to the particular form disclosed, but on the contrary, the invention is to cover all modification/s, equivalent/s and alternative/s falling within the scope of the present invention. The headings used herein are for organizational purposes only and are not meant to be used to limit the scope of the description or the claim. As used throughout this description, the word "may" be used in a permissive sense (i.e., meaning having the potential to), rather than the mandatory sense (i.e., meaning must). Further, the words "a" or "an" means "at least one" unless otherwise mentioned. Furthermore, the terminology and phraseology used herein is solely used for descriptive purposes and should not be construed as limiting in scope. Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the likes are included in the specification solely for the purpose of providing a context for the present invention. It is not suggested or represented that any or all these matters form part of the prior art base or were common general knowledge in the field relevant to the present invention.

In this disclosure, whenever an element or a group of elements is preceded with the transitional phrase "comprising", it is understood that we also contemplate the same composition, element or group of elements with transitional phrases "consisting of", "consisting", "selected from the group of consisting of", "including", or "is" preceding the recitation of the composition, element or group of elements and vice versa.

This invention described herein may be embodied in many different forms and should not be construed as limited to the embodiment set forth herein. Rather, the embodiments are provided so that this disclosure will be thorough and complete and will fully convey the scope of the invention to those skilled in the art. In the following description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention.

Figure 1B:
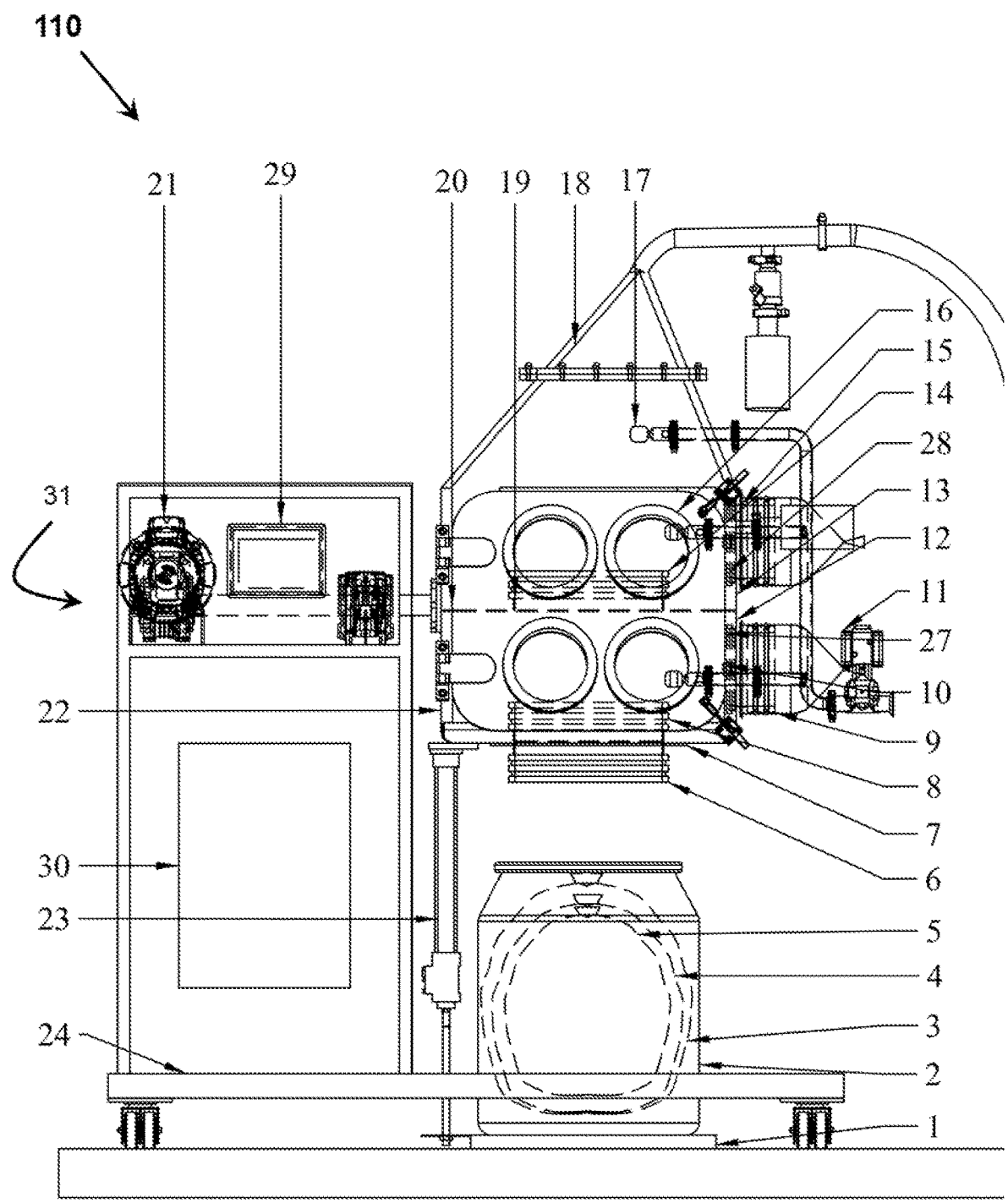
Figure 2:
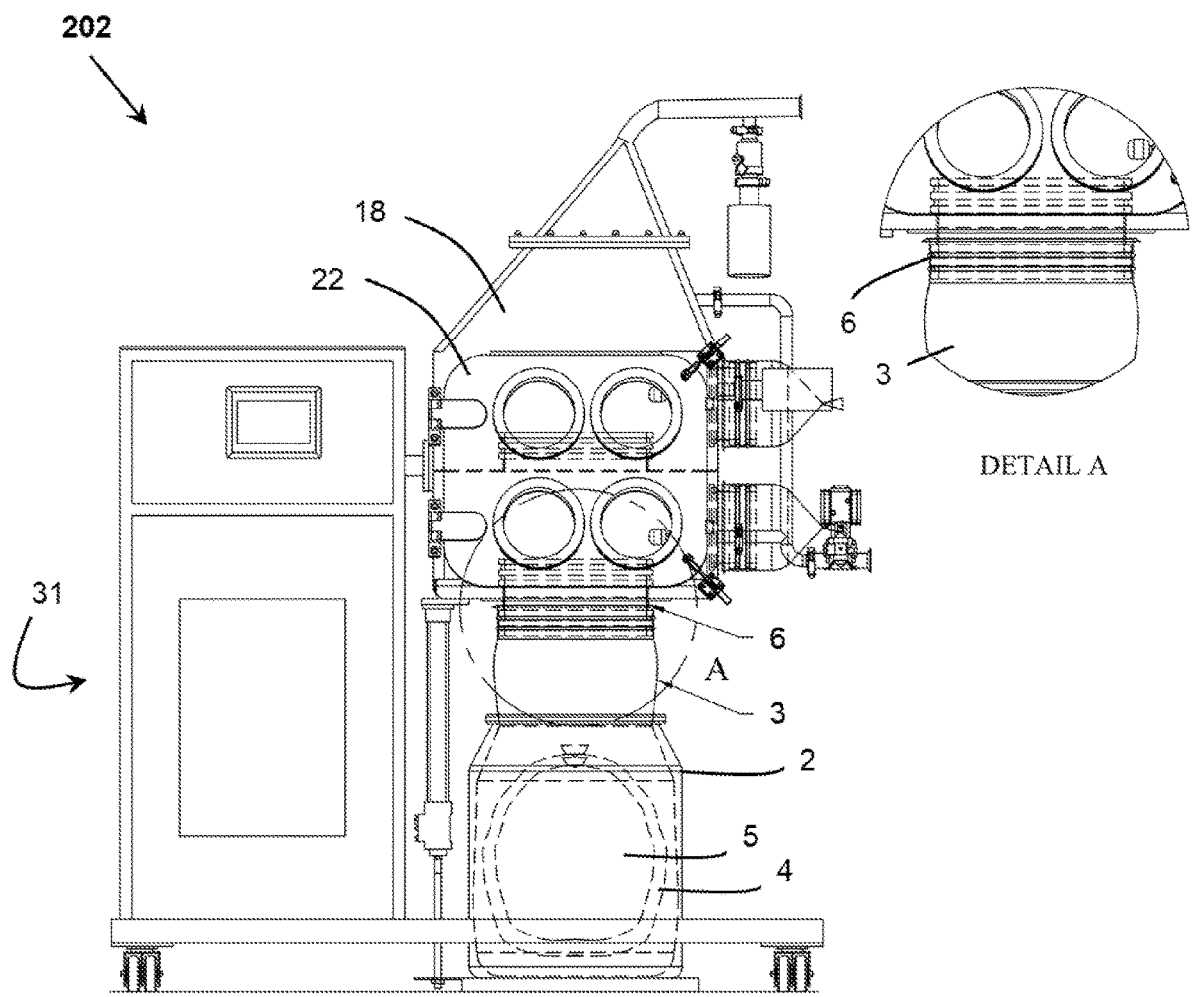
FIG. 2-12 illustrate a contained drum discharge method for discharging toxic powdery materials using the system of FIG. 1, in accordance with an embodiment of the present invention.

FIG. 1A-1B illustrates a contained drum discharge system (110) for toxic powdery materials (hereinafter referred to as "the system (110)"), in accordance with an embodiment of the present invention. FIG. 1A shows the system (110) in connection with a material processing reactor (26) via a vacuum transfer system (25) (as required during implementation (100)); and FIG. 1B shows a closer front view of components of the system (110). As shown in FIGS. 1A and 1B, the system (110) comprises a drum (2). The drum (2) can be understood as a container with or without a lid (like an open top). It is a standard practice to pack hazardous/toxic powdery materials in drum/canister/containers with double/triple liner bags. Depending upon the toxicity and hazardous nature of the material and the transport requirement, the double or triple or single bag packing is decided.

For example: Drugs produced for anti-cancer treatment, are toxic to the cell hence called cytotoxic. The hormones and steroids are also equally harmful for uncontrolled exposure to the operators. Unintended exposure of Immunosuppressant drugs is extremely harmful for the operators. These drugs are packed in triple bags and in smaller packets (5.10 kg etc) to reduce the risk of spill. These triple bags are then packed in suitable drums/canister/container for safe transport. Additionally, some of the materials used in fertiliser and chemical industries are hazardous in nature. Compounds like Sodium methoxide ($CH_3ONa$), Phosphorous pentachloride ($PCl_5$), Phosphorous trichloride ($PCl_3$) reacts violently with water. When bags containing $PCl_5$, $PCl_3$ are opened, they react with moisture present in the atmospheric and produce hydrochloric acid fumes. These fumes when inhaled are harmful. Sodium methoxide when opened to atmosphere containing moisture produce sodium hydroxide. Sodium hydroxide is highly flammable and can create fire hazard around. Accordingly, the present invention is able to safely discharge all the above mentioned toxic powdery materials.

For exemplary implementation described herein, it is assumed that the toxic powdery material is packed in three liner bags (3, 4, 5) and then kept in the drum (2). The drum (2) includes a primary liner bag (5) that has the toxic powdery material which is to be disposed. Since the material is inside the primary bag, so it isn't shown in most of the drawings. The primary liner bag (5) is packed in the secondary liner bag (4), and the secondary liner bag (4) is further packed in a tertiary liner bag (3), to ensure complete containment. The tertiary liner bag (3) is the outer most bag which remains free from any contamination, outside of the secondary bag also remains uncontaminated and may be accessed by an operator without any fear of exposure to the toxic powdery material contained in primary liner bag (5).

The drum (2) is further connected with a lifting mechanism. The lifting mechanism may include, but not limited to, a lifting plate (1) connected with a lifting cylinder (23) (such as hydraulic cylinder), as shown in FIG. 1A-1B. The drum (2) is placed on the lifting plate (1), which may be lifted and lowered using the lifting cylinder (23), as and when required by the operator.

The system (110) further comprises a glove box (22), to which the drum (2) may be attached during the implementation. The glove box (22) may have, but not limited to, a cuboidal, a cubical, spherical or a cylindrical, or a conical chamber, made of suitable metal and a transparent (see-through) material such as glass, acrylic etc on one or more sides. Besides, the glove box (22) may be divided into an upper deck (13) and a lower deck (12) by a partition (20) and is envisaged to include a plurality of glove ports (16) on one side and a plurality of thrashout ports with door (9, 15) on another side of the glove box (22). Each of the plurality of glove ports (16) has a connected glove attachment. The glove attachment is provided on the inside of the glove box (22) and can be viewed from outside the glove box (22) through a view panel (10) due to transparency of the glove box (22). So, when the operator need to access the contents inside the glove box (22), he/she can only access them through the plurality of glove ports (16) using the glove attachments. This allows to prevent any direct contact of the operator with the toxic material inside the glove box (22). In some embodiments, the glove box (22) can also be designed with single deck depending on the toxicity or hazardous nature of the toxic powdery material to be discharged.

Additionally, the glove box (22) is provided with tubular pipe with 'O ring to tie respective liner bags from the drum (2), easily and safely. These have been referred as liner ports. Since the exemplary implementation assumed the usage of three liner bags (3, 4, 5), so, there is a liner port provided for each liner bag. Herein, a first liner port (6) (for tertiary liner bag (3)) is provided at a bottom of the glove box (22). Then, a second liner port (8) (for secondary liner bag (4)) has been provided in a lower deck (12) of the glove box (22), which is only accessible via the plurality of gloves ports in the lower deck (12). Also, a third liner port (14) (for primary liner bag (5)) has been provided in the upper deck (13) of the glove box (22) and is only accessible via the plurality of glove ports (16) in the upper deck (13).

Moreover, at the bottom of the glove box (22), there is also provided a sealing gasket (7). So, a mouth (top) of the drum (2) gets sealed when the drum (2) is lifted and docked onto the bottom of the glove box (22). Once connected with the drum (2), the glove box (22) is adapted to remain air-tight (enclosing a vacuum therein), thereby isolating the glove box (22) from the surroundings and the operator.

In accordance with an embodiment of the present invention, the glove box (22) is provided with a HEPA filters in upper deck (13) and in lower deck (12), Nitrogen flushing nozzles, water washing provision etc. A Spray ball (17) connected to relevant valves and pipe lines are provided for cleaning of all contact area after discharge of powder material. Cleaning liquid can be sprayed inside and properly clean all contaminated area. Inner side of the third liner port there is provided a circular vacuum slot (19). The vacuum slot (19) is connected to the vacuum pump through HEPA filter. This enables to pull and hold the second primary liner bag (5) while removing the first primary liner bag (5), this procedure will prevent, no reside dust enters into the upper deck (13) (while changing the primary liner bag (5). In some embodiments, the glove box (22) can be connected to suction blower unit through HEPA filter to create a negative pressure environment inside the glove box (22). Other instrumentation like differential pressure measurement, air velocity etc. can be integrated with the glove box (22) for achieving higher containment level. Besides, the glove box (22) is provided with cleaning in place (CIP) and washing in place (WIP) arrangement for complete cleaning. The wash liquid can be sucked out through the connected vacuum transfer system (25). Alternatively, the glove box (22) can also be connected to a drainage system. Also, the nitrogen inertisation can also be done with supply of nitrogen to the glove box (22).

Additionally, the system (110) includes a hopper (18) connected at a top of the glove box (22). The hopper (18) may have a conical top or a flat top depending upon the requirement and application. The hopper (18) is envisaged to receive and collect the toxic powdery material when The drum (2) is inverted. The conical shape would be beneficial for transferring large amount of toxic powdery material easily, while the flat top can be used for taking samples of toxic or hazardous material from the drum (2) without exposure. The hopper (18) is connected with the vacuum transfer system (25) includes a vacuum pump that is configured to transfer the toxic powdery material using one or more attachments such as suction pipe, valves etc. The vacuum transfer system (25) may be mounted on any material processing reactor (26) (which can be understood as receiving vessel) for receiving and processing the discharge of the toxic powdery material from The drum (2).

The material processing reactors are commonly used in chemical and pharmaceutical industry for carrying out the production and reaction of various chemicals to produce the drugs. They are available in various sizes and material of construction. The reactions are carried out in the reactors under pressure, under vacuum and at elevated/lower temperatures.

Furthermore, the system (110) comprises a control unit (31) connected with the glove box (22) via a rotation mechanism and is also connected with the lifting mechanism to operate the lifting cylinder (23) and the lifting plate (1). The rotation mechanism may comprise one or more geared motors (21), or servo motors connected with a rotation shaft that is connected with the glove box (22). The rotation mechanism can rotate the glove box (22) (and attached components) up to 180 degrees and turn it upside down. The control unit (31) houses the rotation mechanism, and also includes a PLC (29) and a control panel (30) to control operations of the rotation mechanism and the lifting mechanism.

The control unit may also include a geared motor with positioning sensors connected with PLC/HMI. It also contains the regulators for operating lifting cylinder. The control unit also has relevant sensors (such as infrared/ultrasonic sensors etc.) to detect obstructions or humans around the system and prevent unintended rotation.

The system (110) also includes a trolley (24) having a plurality of wheels to mount the components of the system (110) and transport the system (110) as and when required by the operator. For example: In one embodiment, the system (110) can be directly mounted on the material processing reactor (26), if required, through a split butterfly valve. The trolley (24) can be moved near to the material processing reactor (26) and a discharge nozzle of the hopper (18) can be directly connected to material processing reactor (26) through the split butterfly valve to unload the toxic powdery from the drum (2).

FIGS. 2-12 illustrate a contained drum discharge method (hereinafter referred to as "the method"), of the system (110) of FIG. 1A-1B, in accordance with an embodiment of the present invention. Each of the FIGS. 2-12 diagrammatic representation one or more steps (202-224) of the method. In the following exemplary implementation, it is assumed that the drum (2) containing the toxic powdery material to be discharged includes a triple packing of the liner bags, with the material contained in the innermost primary liner bag (5). So, The drum (2) is placed on the lifting plate (1) below the glove box (22).

The method starts at step 202 by latching the tertiary liner bag (3) to the first liner port (6) of the glove box (22). The same has been illustrated in FIG. 2. Since the tertiary liner bag (3) is free from any contamination, so the operator pulls up the tertiary liner bag (3) (outermost bag), opens the sealing and locks the open mouth of the tertiary liner bag (3) onto the first liner port (6) with 'O' ring.

Figure 3:
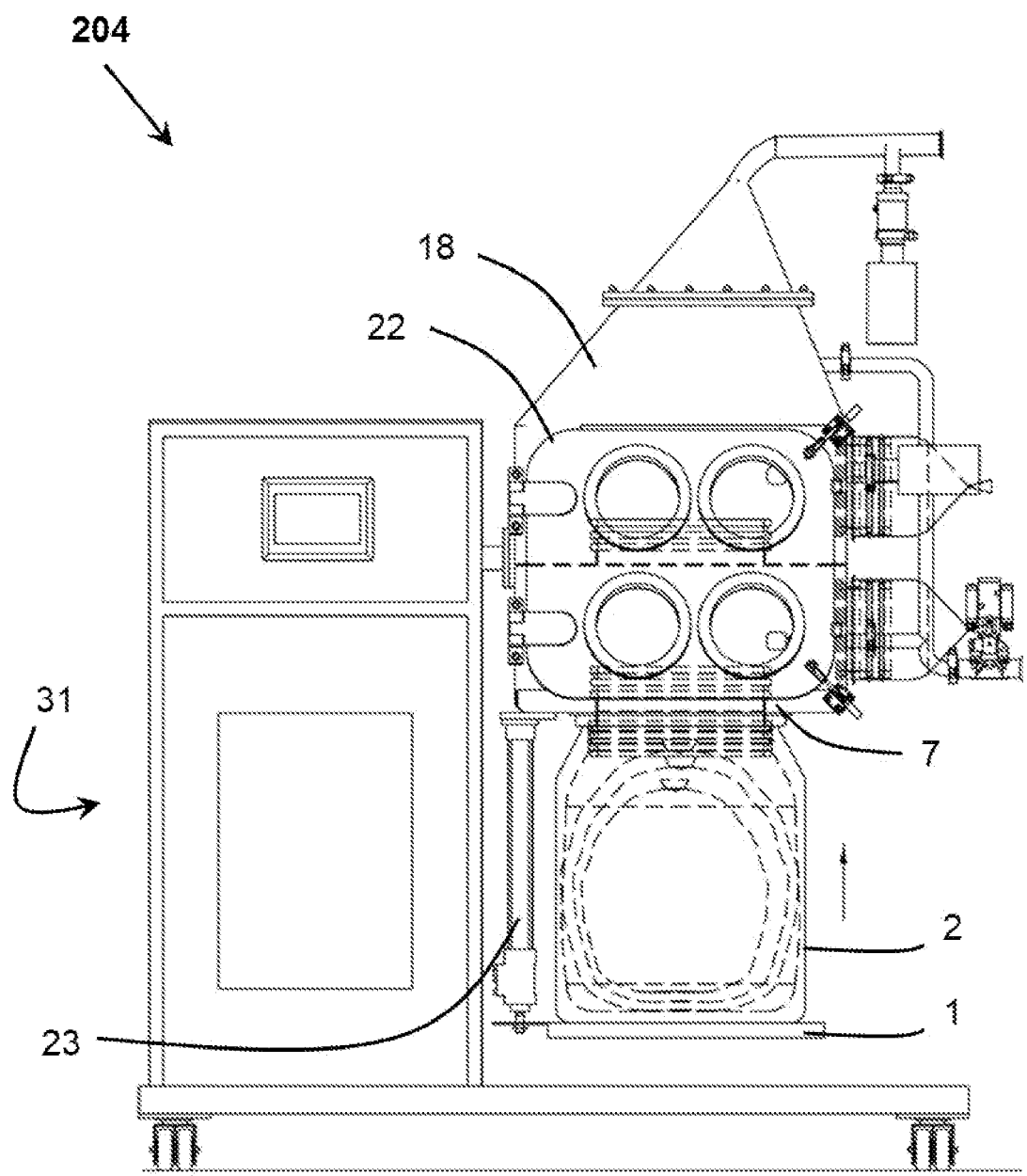

Next, at step 204 shown in FIG. 3, The drum (2) is lifted using the lifting mechanism which can be actuated using the control unit (31), till the drum (2) touches the sealing gasket (7) provided at the bottom of the glove box (22). Accordingly, The drum (2) is sealed and docked at the bottom of the glove box (22). With this the drum (2) and the secondary liner bag (4) and the primary liner bag (5) inside The drum (2) become inaccessible and closed to atmosphere.

Figure 4:
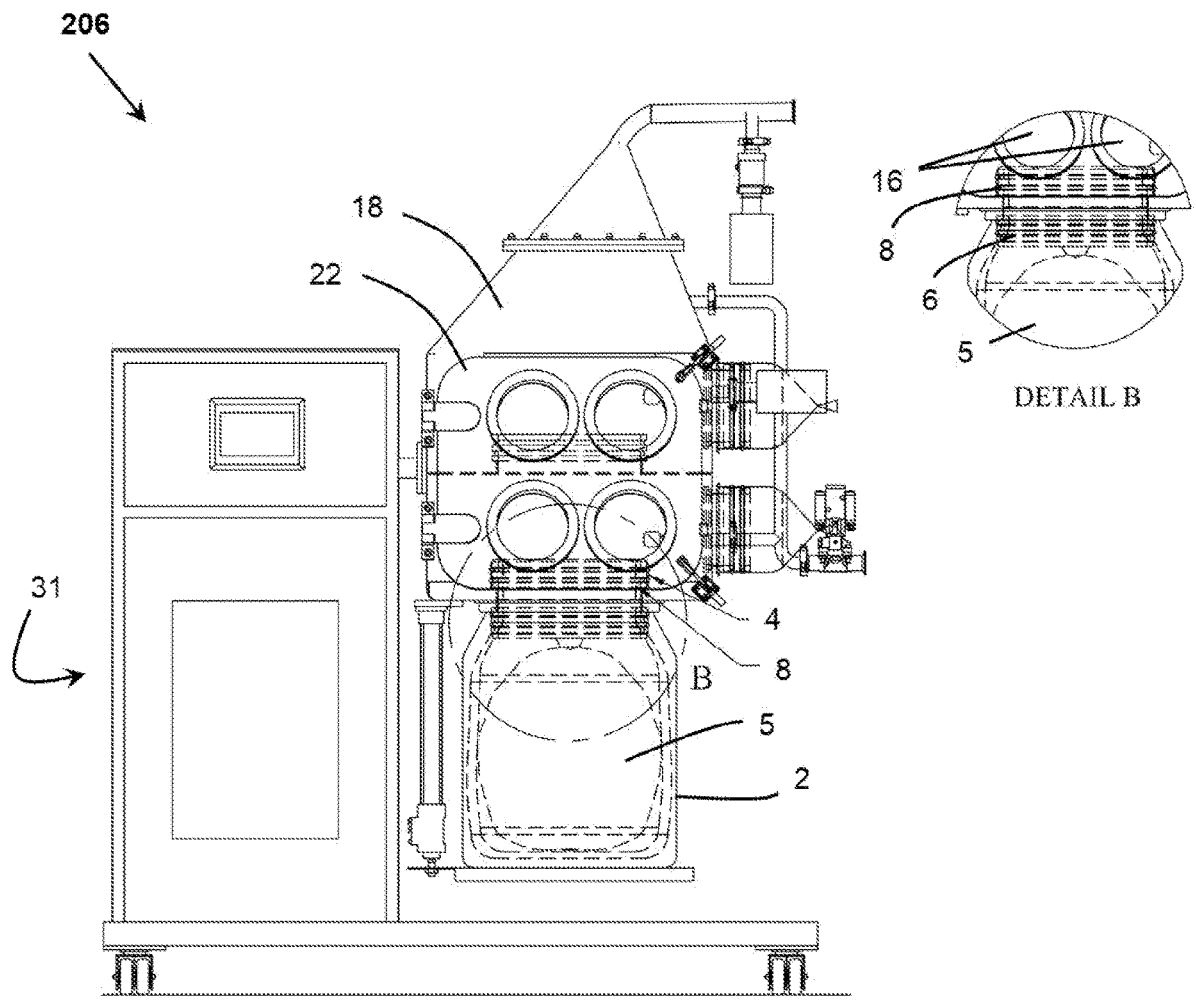

After that, at step 206 shown in FIG. 4, the secondary liner bag (4) is latched to the second liner port (8). For performing this step, the operator accesses the lower deck (12) of the glove box (22) using the plurality of glove ports (16) provided in the lower deck (12) and uses the glove attachment to pull up a loose portion of the secondary liner bag (4) to open it. The operator then locks the secondary liner bag (4) to the second liner port (8) inside the lower deck (12). After this, the sealed primary liner bag (5) becomes accessible inside the secondary liner bag (4).

Figure 5:
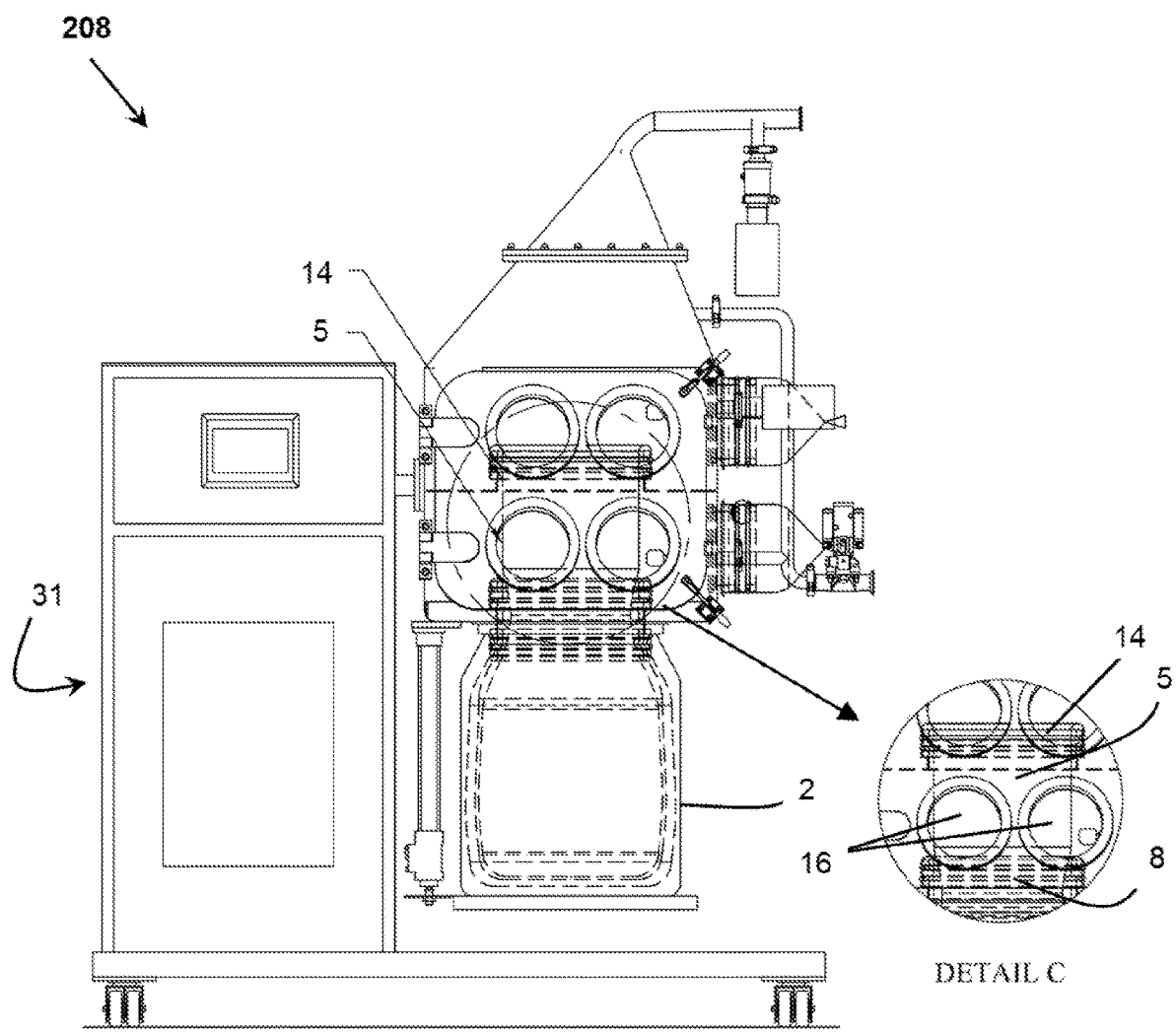

Next, at step 208 shown in FIG. 5, the primary liner bag (5) is latched to the third liner port (14). For performing this step, the operator accesses the lower deck (12) and upper deck (13) of the glove box (22) using the plurality of glove ports (16) provided in the lower deck (12)/upper deck (13) and uses the glove attachment to pull up the primary liner bag (5) to open it inside the glove box (22). The operator then locks the primary liner bag (5) onto the third liner port (14) with 'O' ring in the upper deck (13).

Figure 6:
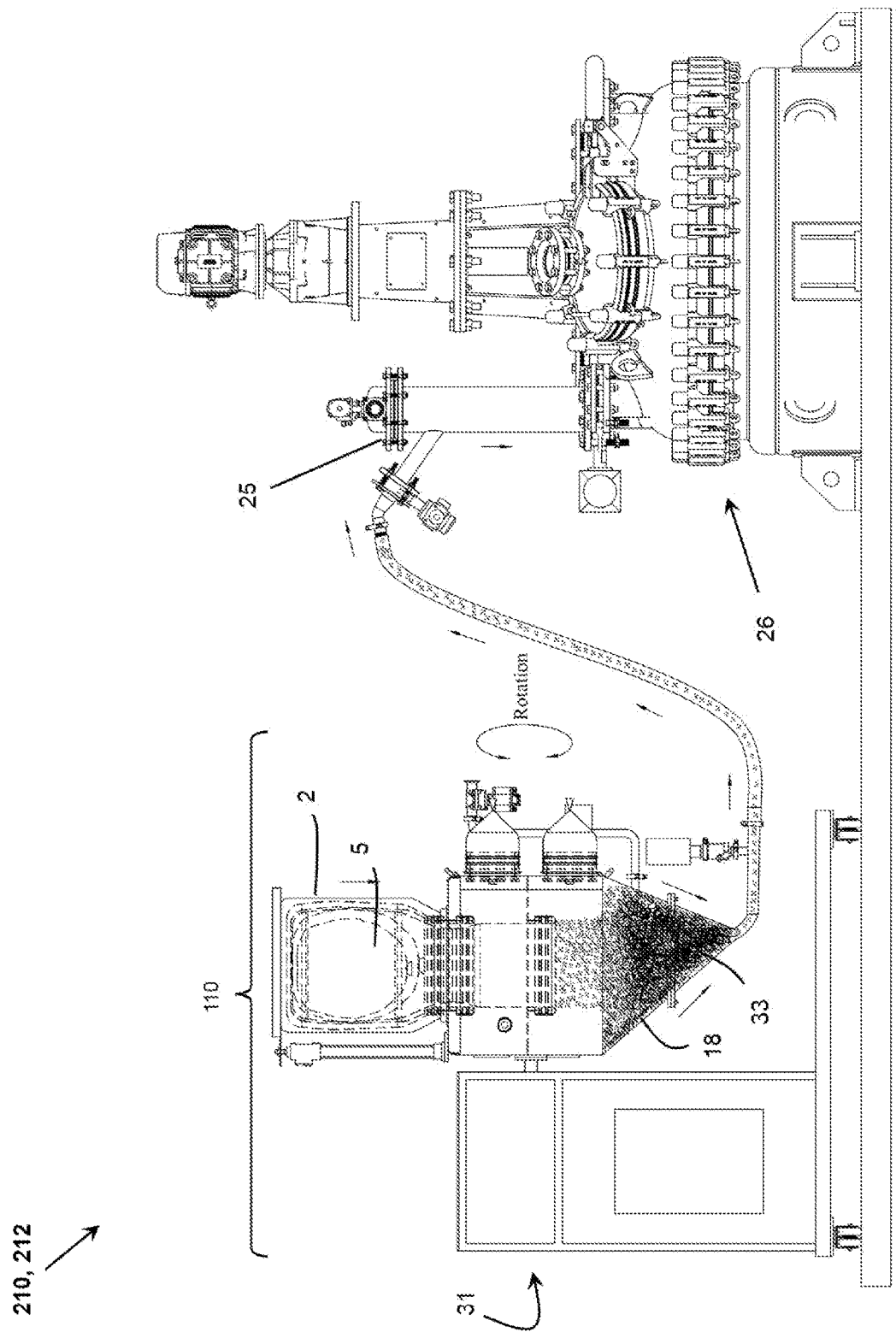

After that, at step 210 shown in FIG. 6, the glove box (22) (along with the locked primary liner bag (5) and The drum (2) is rotated by 180° using the rotation mechanism, operated from the control unit (31). Once the glove box (22) is rotated, The drum (2) becomes upside down and the contents of The drum (2) get discharged into the bottom portion of the glovebox. So, the toxic powdery material (32) contained in the primary liner bag (5) is unloaded into the hopper (18) connected with the glove box (22).

Moreover, at step 212, the toxic powdery material (32) is transferred through the vacuum transfer system (25) to material processing reactor (26). The same has been illustrated in FIG. 6. It will be appreciated by a skilled addressee that only the toxic powdery material (32) is unloaded onto the hopper (18) below, however the primary (5), secondary (4) or tertiary liner bag (3) do not come down with the material. The space between tertiary liner bag (3) and the drum (2) is sealed hence there is no scope for air entry. Hence tertiary liner bag (3) will not come down. Similarly, the secondary liner bag (4) and the tertiary liner bag (3) are also sealed with the respective liner port and previous bag. Hence there is no scope for air entry into the space, preventing the liner bags (3, 4, 5) to slide down. This will ensure the toxic powdery material (32) flows down but not the liner bags (3, 4, 5).

Figure 7:
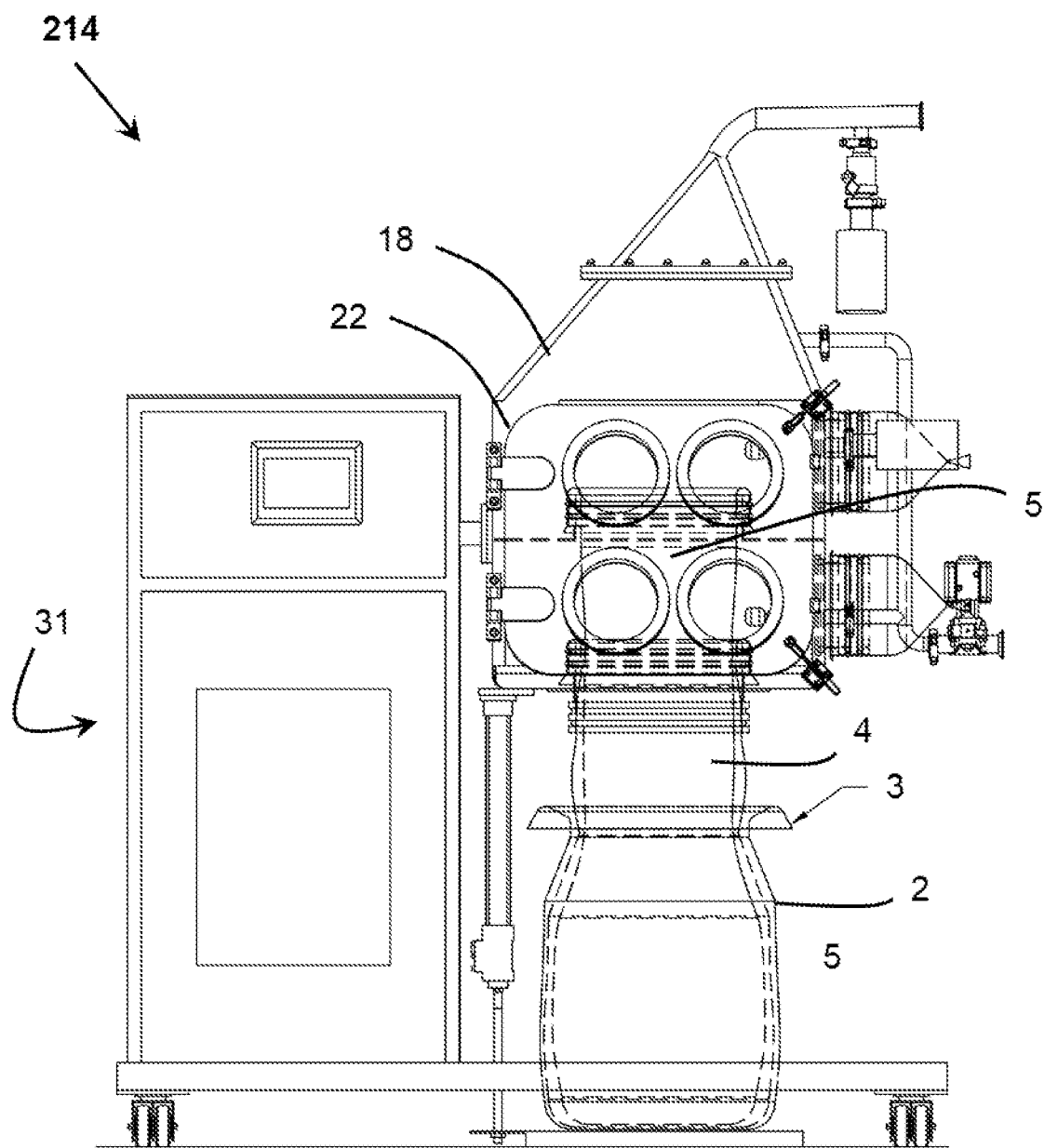

Additionally, at step 214 shown in FIG. 7, the glove box (22) is rotated back to the original position using the rotation mechanism after the contents of the drum (2) are emptied. Also, the drum (2) is then lowered using the lifting mechanism. Even in this position, all the liner bags (3, 4, 5) are in position onto the respective liner ports (6, 8, 14) in sealed condition. Accordingly, the operator may now remove the tertiary liner bag (3) (outermost bag sealed with the tertiary liner port (6)), which remains free from any contamination throughout the process. The tertiary liner bag (3) is put it into the empty drum (2). Alternatively, the operator may double crimp the tertiary liner bag (3) and cut the bag in between the crimp. The drum (2) may be removed from the lifting plate (1) and a new drum (33) may be placed for discharge.

Figure 8:
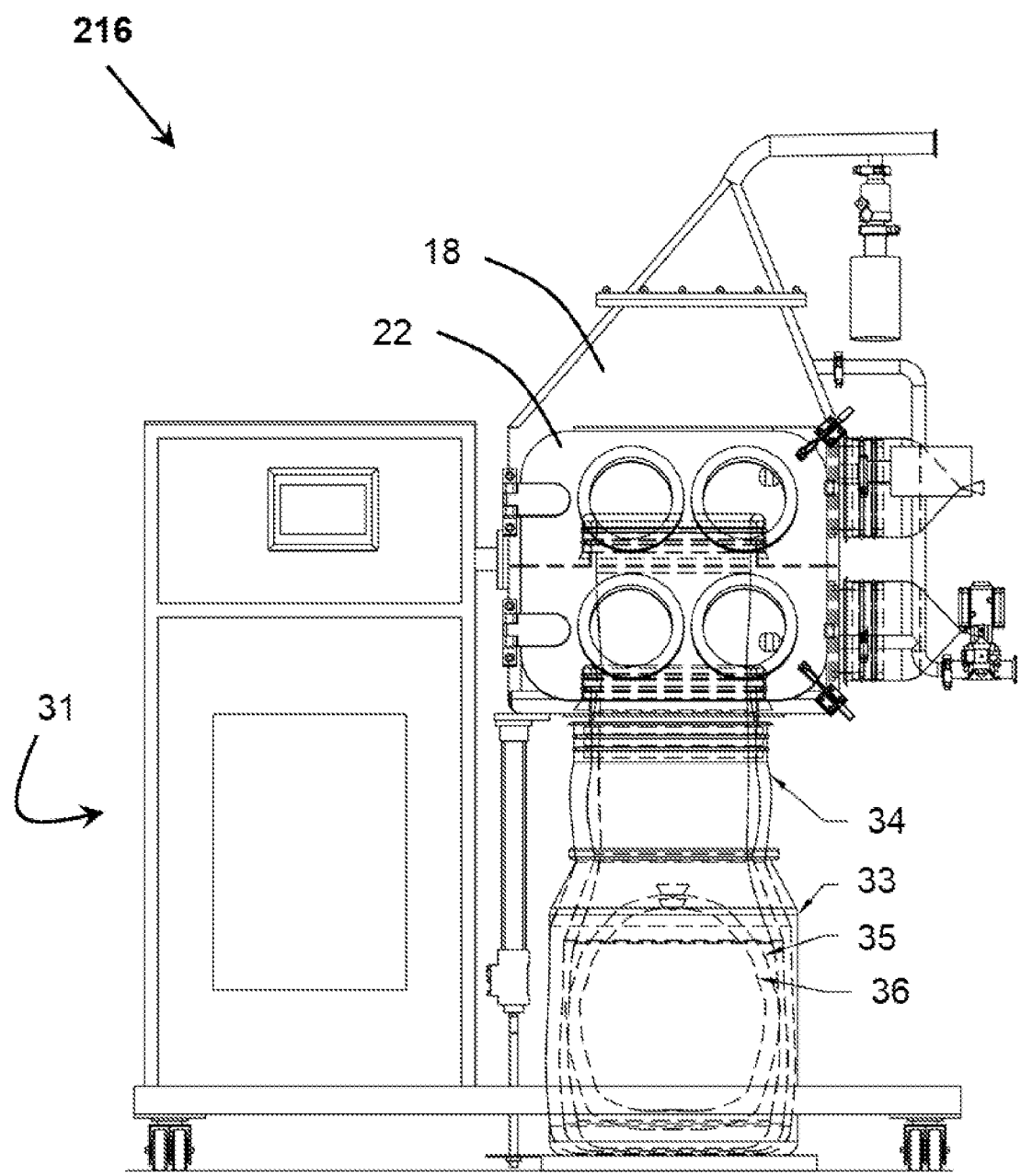

Further, at step 216 shown in FIG. 8, the drum (2) with the new drum (33) by latching a new tertiary liner bag (34) of the new drum (33) to the first liner port (6). Same procedure as followed previously may be repeated for latching. The operator first opens the new tertiary liner bag (34) and locks it with the first liner port (6) and lifts the drum (2) using the lifting mechanism to seal it to the bottom of the lower deck (12). It is to be noted that still, the contaminated secondary liner bag (4) and the primary liner bag (5) of the first drum (2) are sealed with the second liner port (8) and the third liner port (14) respectively. So, they have to be removed safely.

Figure 9:
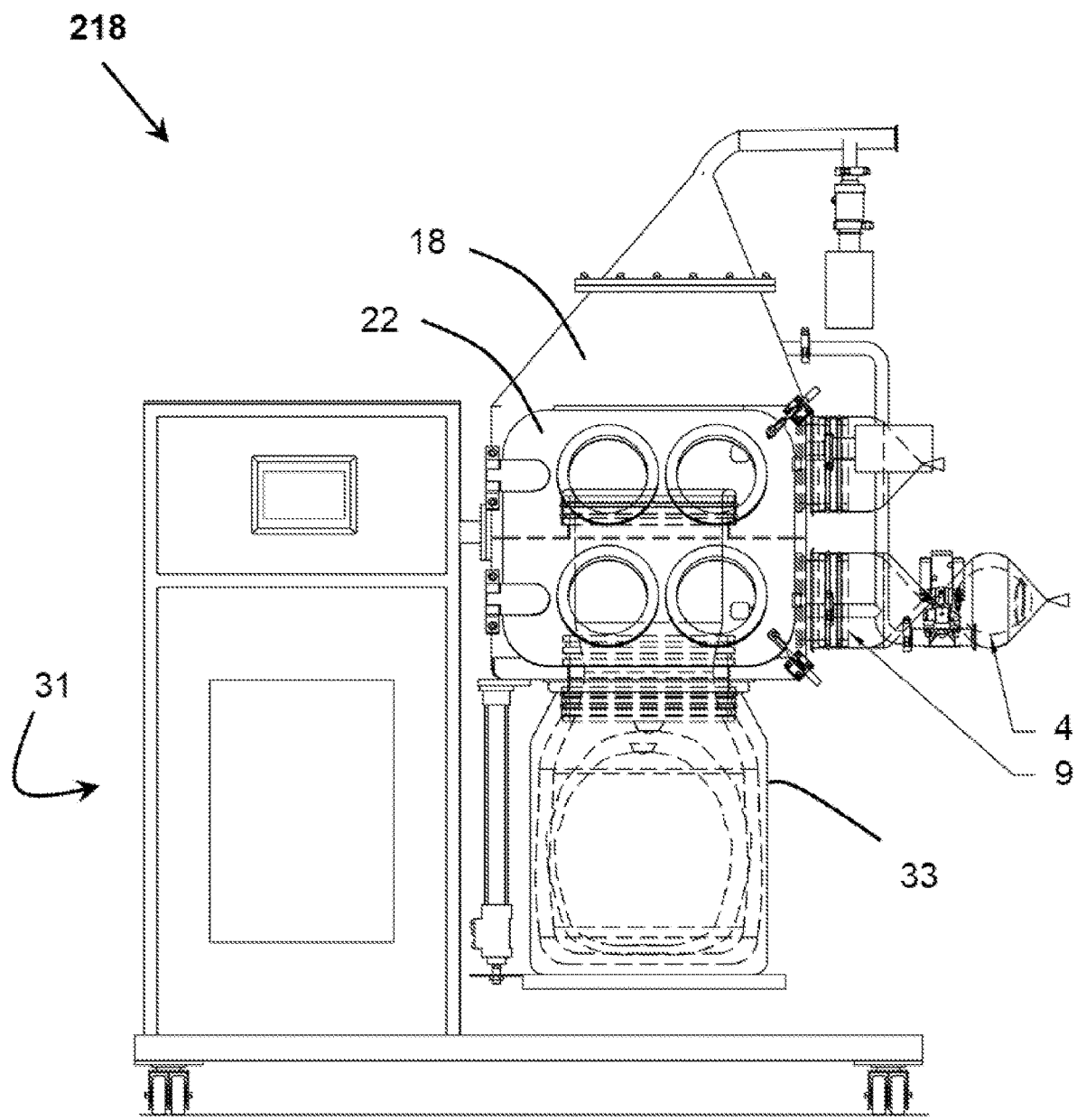

So, at step 218 shown in FIG. 9, the secondary liner bag (4) of the drum (2) is removed from the secondary liner port (8) by the operator using the glove attachment of the plurality of glove ports (16) in the lower deck (12). At the same time, the operator uses the glove attachments to open the door and dump the secondary liner bag (4) to a thrash out port (9) of the plurality of thrashout ports (9, 15). Each thrashout port may have door and disposal bags connected with it. So, when the contaminated secondary liner bag (4) is dumped in the thrash out port (9), it is automatically received in the connected disposal bag, so that the secondary liner bag (4) is not exposed to the environment or the operator when it comes out of the glove box (22). It may then be doubly crimped and safely dumped in the first drum (2). This ensures the highest level of containment.

Figure 10:
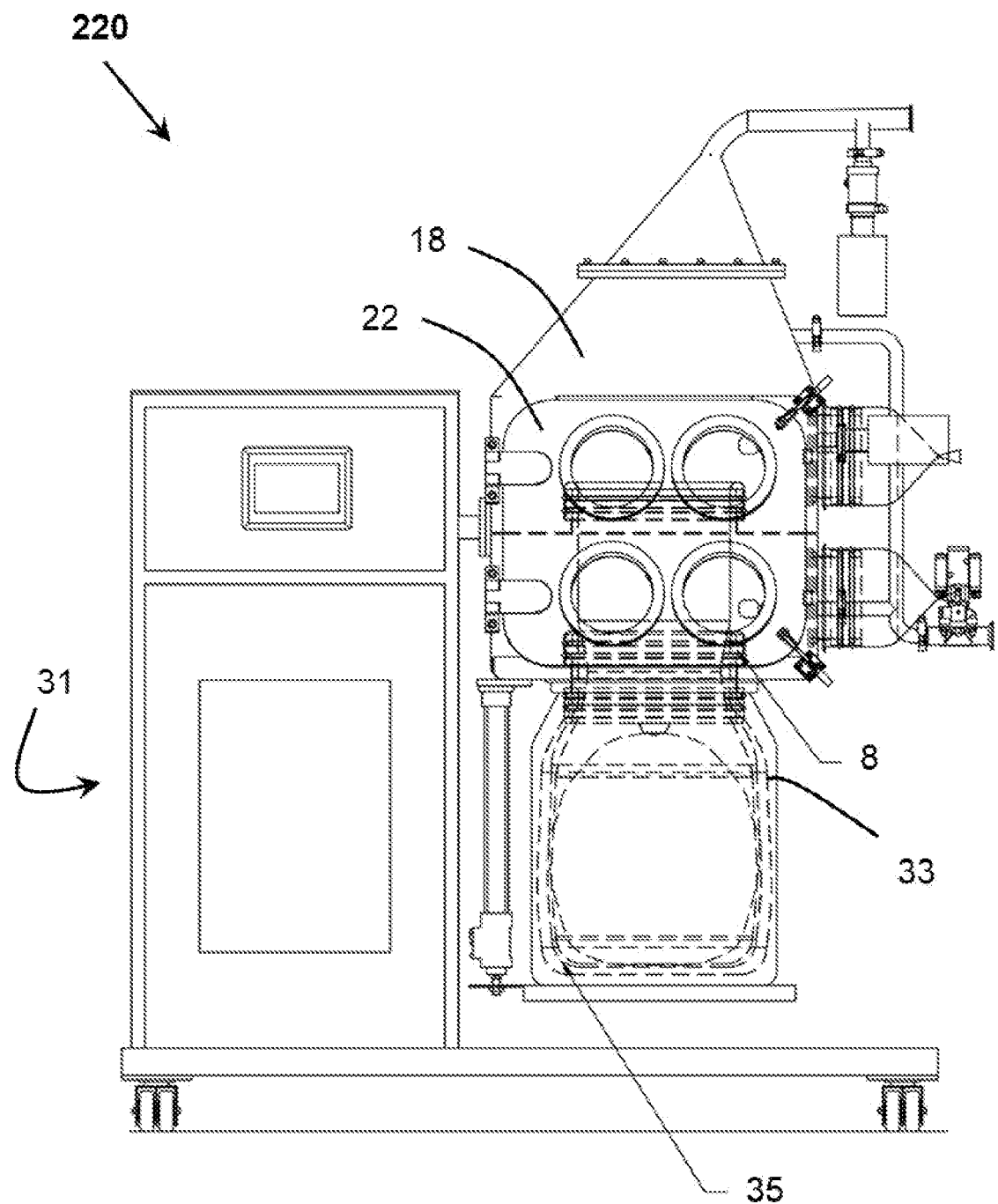

After that, at step 220 shown in FIG. 10, a new secondary liner bag (35) of the new drum (33) is latched to the second liner port (8) following the same procedure for latching, as was used previously by the operator. At this moment the primary liner bag (5) of the first drum (2) is still in position.

Figure 11:
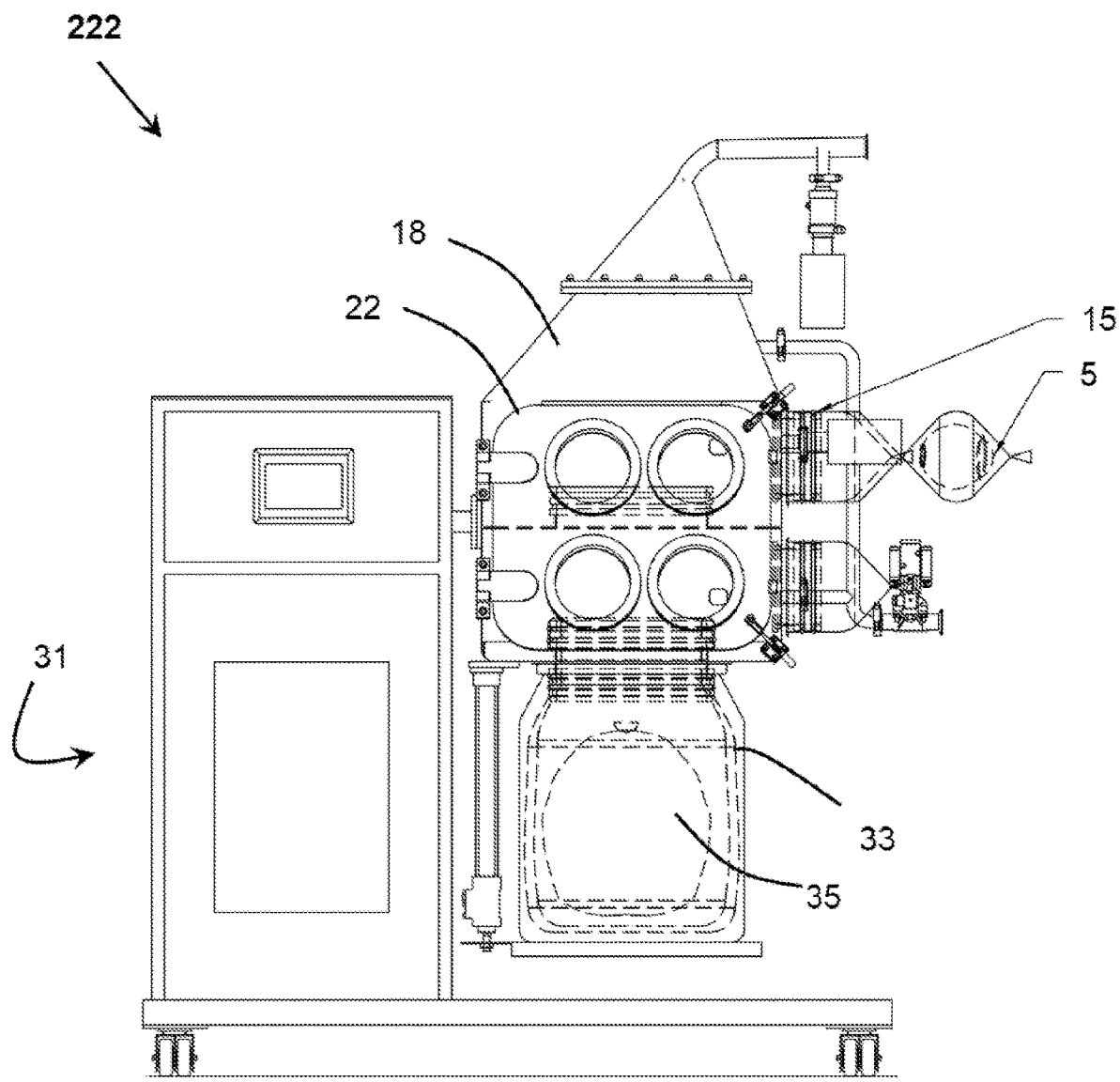

Next, at step 222 shown in FIG. 11, a new primary liner bag (36) of the new drum (33) is held onto the vacuum slot (19) of the third liner port, while the primary liner bag (5) of the drum (2) is removed for dumping to the thrash out port (2) of the plurality of thrashout ports (9, 15). This is performed using the glove attachment of the plurality of glove ports (16) in the upper deck (13). Here also, when the contaminated primary liner bag (5) is dumped in the thrash-out port (15) after opening the door, it is automatically received in the connected disposal bag, so that the contaminated primary liner bag (5) is not exposed to the environment or the operator when it comes out of the glove box (22). It may also be doubly crimped and safely dumped in the first drum (2).

Figure 12:
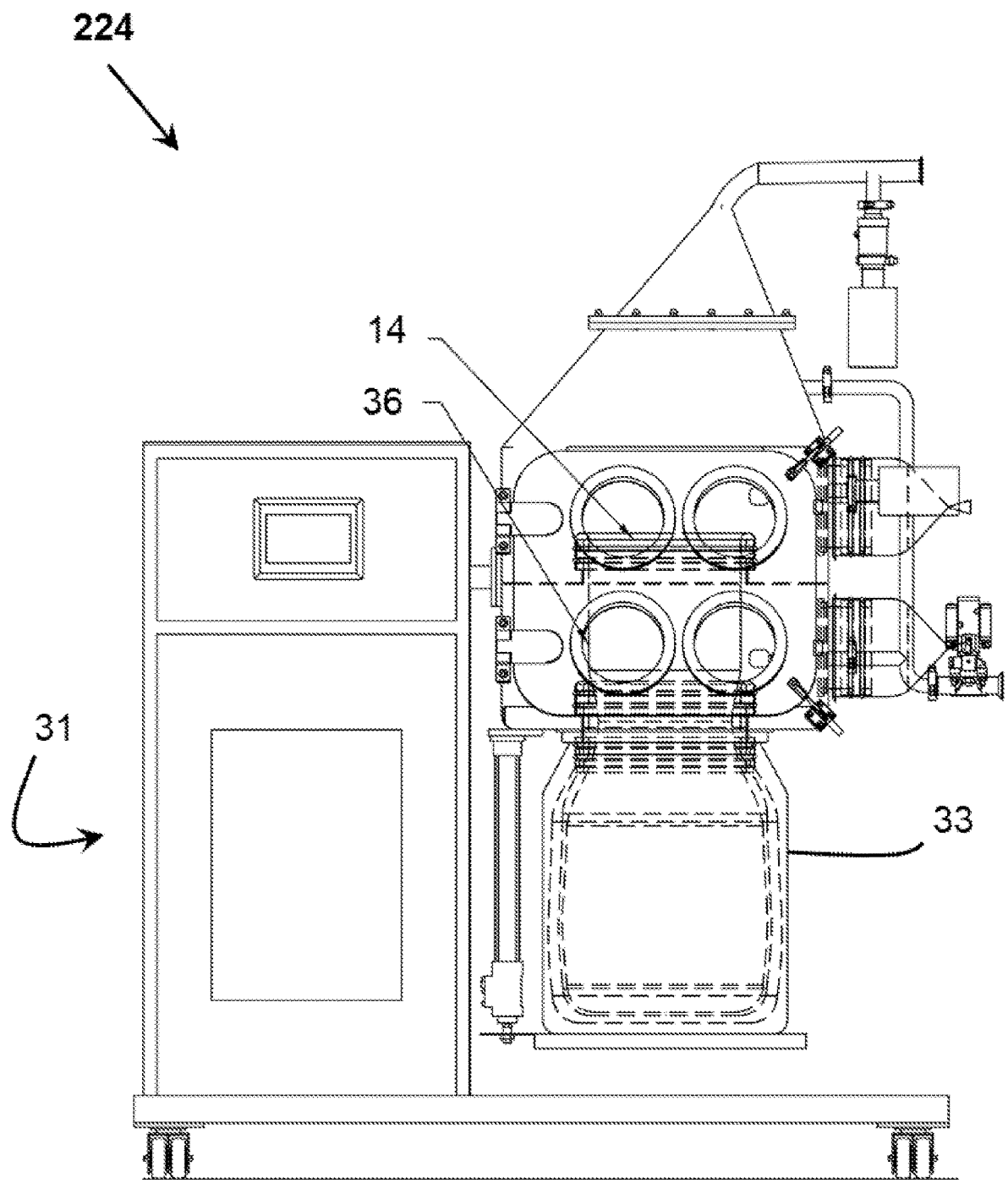

Finally, at step 224 shown in FIG. 12, the new primary bag is latched to the third liner port (14) using the same glove attachment by the operator. In this manner, the contents of the first drum (2) are safely discharged and the new drum (33) is also ready for safe discharge. This procedure is continued as long as it is required.

It will be appreciated by a skilled addressee that as the powdery material is extremely toxic or hazardous, the secondary and primary liner bags (4, 5) of the first drum (2) are only removed after the next new drum (33) is docked onto the bottom of the glove box (22). This enables to completely avoid cross contamination. This helps to ensure the highest level of containment.

The present invention offers a number of unique features:
- Even when the drum (with liner bags and toxic powdery materials) is upside down, only the toxic powdery materials flows down and not the bags. The liner bags don't come out of the drum with powder. Since the bags and drums are sealed from one side, air will not allow the bag to slide down, but only powder slides down.
- The glove box may be directly connected to vacuum transfer system. The vacuum transfer system sucks the powder from the glove box and delivers into the receiving vessel in closed and contained manner without exposure of the powder.
- The highest level of containment is made feasible. The system will ensure even the small traces are not escaped into the atmosphere.
- The whole system can be placed on the weighing scale. Using the loss in weight method the measure quantity of the powder can be taken out.
- The system is capable of handling the toxic powdery materials in multiple bags, that are not only suitable for transfer of large quantity of powder materials, but also suitable to use for taking out small quantity of samples in contained manner.
- The present invention not just provides technical advancement, but also has economic significance, as it cost-effective as compared to the expensive systems known in the art.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing the broadest scope, consistent with the principles and the novel and inventive features disclosed or suggested herein. Accordingly, the invention is anticipated to hold on to all other such alternatives, modifications, and variations that fall within the scope of the present invention and the appended claims.

The invention claimed is:

1. A contained drum discharge system for toxic powdery materials without exposure to operator and environment, the system comprising:
   a drum connected with a lifting mechanism, wherein the drum includes a primary liner bag having the toxic powdery material to be disposed, contained within the secondary liner bag, and a tertiary liner bag enclosing the secondary liner bag;
   a glove box having:
   an upper deck and a lower deck;
   a plurality of glove ports-connected with respective glove attachments, on one side and a plurality of thrashout ports on another side of the glove box;
   a sealing gasket to connect with the drum;
   a first liner port provided at a bottom of the glove box;
   a second liner port provided in a lower deck of the glove box and only accessible via the plurality of gloves ports in the lower deck; and
   a first liner port provided in the upper deck of the glove box and only accessible via the plurality of glove ports in the upper deck;
   a hopper connected at a top of the glove box and with a vacuum transfer system of a material processing reactor; and
   a control unit connected with the glove box via a rotation mechanism and with the lifting mechanism of the drum.

2. The system as claimed in claim 1, wherein the control unit is configured to:
   actuate the lifting mechanism lift to the drum to connect with the glove box using the sealing gasket, and allowing the tertiary liner bag to be attached and sealed with the first liner port of the glove box, the secondary liner bag with the second liner port and the primary liner bag with the third liner port, one by one, using respective coupling means; and
   actuate the rotation mechanism to rotate the glove box 180°, and thereby the connected drum and the hopper upside down to allow the toxic powdery material in the tertiary line bag to discharge into the hopper;
   wherein the vacuum transfer system is configured to transfer the toxic powdery material from the hopper to the material processing reactor for processing and safe disposal;
   wherein the control unit is also configured to rotate the glove box back to original position and lower the drum as when required by an operator.

3. The system as claimed in claim 1, wherein a space between the tertiary liner bag and the drum is sealed to prevent any air entry, thereby ensuring only the toxic powdery material flows down and not the liner bags, when the drum is turned upside down.

4. The system as claimed in claim 1, wherein the plurality of thrashout ports with door include connected disposal bags, adapted to securely receive the primary liner bag and the secondary liner bag after emptying, and then taken out from the glove box.

5. The system as claimed in claim 1, wherein the glove box is adapted to remain air-tight, enclosing a vacuum therein, and is made from an openable, sealed and latched transparent glass view panel;
   wherein the glove box includes HEPA filters in the upper deck and in the lower deck, nitrogen flushing nozzles, and water washing provision.

6. The system as claimed in claim 1, wherein the first liner port is provided with a circular vacuum slot and the vacuum slot is connected to a vacuum pump through HEPA filter.

7. The system as claimed in claim 1, wherein the glove box is connected to a suction unit through HEPA filters to maintain a negative pressure inside the glove box, thereby preventing any escape of powder dust/gas from the glove box.

8. The system as claimed in claim 1, wherein the control unit houses the rotation mechanism, a PLC and a control panel.

9. The system as claimed in claim 1, further comprising a trolley having a plurality of wheels to mount the system and transport the system as and when required by the operator.

10. A contained drum discharge method for toxic powdery materials as claimed in claim 1, the method comprising:
   latching the tertiary liner bag to the first liner port of the glove box;
   lifting the drum and docking the drum to a gasket at the bottom of the glove box;
   latching the secondary liner bag to the second liner port;
   latching the primary liner bag to the third liner port;
   rotating the glove box by 180° and unloading the toxic powdery material contained in the primary liner bag to the hopper connected with the glove box;
   transferring the toxic powdery material through the vacuum transfer system to material processing reactor;
   rotating the glove box back to the original position, lowering the drum and removing the tertiary liner bag;
   replacing the drum with a new drum by latching a new tertiary liner bag of the new drum to the first liner port;
   removing the secondary liner bag of the drum, opening the door and dumping it to a thrashout port of the plurality of thrashout ports;
   latching a new secondary liner bag of the new drum to the second liner port;
   holding a new primary liner bag of the new drum onto a vacuum slot of the third liner port and removing the primary liner bag of drum for dumping to a thrash out port with door of the plurality of thrashout ports; and
   latching the new primary liner bag to the third liner port.

* * * * *